US008358996B2

United States Patent
He et al.

(10) Patent No.: US 8,358,996 B2
(45) Date of Patent: Jan. 22, 2013

(54) IMAGE REJECTION

(75) Inventors: Shousheng He, Södra Sandby (SE); Anders Berkeman, Lund (SE)

(73) Assignee: Cambridge Silicon Radio Limited, Cambridge (GB)

( * ) Notice: Subject to any disclaimer, the term of this patent is extended or adjusted under 35 U.S.C. 154(b) by 342 days.

(21) Appl. No.: 12/874,655

(22) Filed: Sep. 2, 2010

(65) Prior Publication Data

US 2011/0070858 A1 Mar. 24, 2011

(30) Foreign Application Priority Data

Sep. 23, 2009 (GB) .................................... 0916709.9

(51) Int. Cl.
*H04B 1/10* (2006.01)
(52) U.S. Cl. ..................... 455/302; 455/63.1; 455/67.13; 375/346
(58) Field of Classification Search .................. 455/63.1, 455/67.13, 296, 302, 313, 323; 375/322, 375/346

See application file for complete search history.

(56) References Cited

U.S. PATENT DOCUMENTS

| 6,958,782 | B2 * | 10/2005 | Kishi .............................. 375/346 |
| 7,627,295 | B2 * | 12/2009 | Takahiko et al. .............. 455/319 |
| 7,672,655 | B1 * | 3/2010 | Cousinard ....................... 455/285 |
| 7,693,225 | B2 * | 4/2010 | Lin et al. ......................... 375/346 |
| 8,086,197 | B2 * | 12/2011 | Doris et al. ................. 455/179.1 |

* cited by examiner

*Primary Examiner* — Quochien B Vuong
(74) *Attorney, Agent, or Firm* — RatnerPrestia

(57) ABSTRACT

A receiver (10) for extracting a desired signal component (70) from a received signal, which received signal contains the desired signal component (70) and may contain an interfering signal component (72), wherein the receiver (10) comprises a first mixer (16) which generates an intermediate frequency signal containing a frequency-shifted version of the received signal and a frequency-shifted version of an image of the received signal, the receiver further comprising: a second mixer (26) for shifting the desired signal component (70) of the intermediate frequency signal such that it is centered on a baseband frequency, so as to generate a first composite signal containing the shifted desired signal component (70) and a shifted version of any interfering signal component (76) contained in the image of the received signal; a third mixer (30) for shifting an image of the desired signal such that it is centered on the baseband frequency, so as to generate a second composite signal containing the shifted image (74) of the desired signal component and a shifted version (72) of any interfering signal component contained in the received signal; an estimator (34) for estimating, from the first and second composite signals, a coefficient indicative of the amount of the interfering signal (72) component that is present with the desired signal component (70) in a selected one of the composite signals; a multiplier (36) for scaling the complex conjugate of the selected composite signal by the coefficient so estimated; and an adder (38) for subtracting the scaled signal output by the multiplier (36) from the other composite signal to obtain a scaled version of the desired signal component.

11 Claims, 2 Drawing Sheets

IMAGE REJECTION

Figure 1:
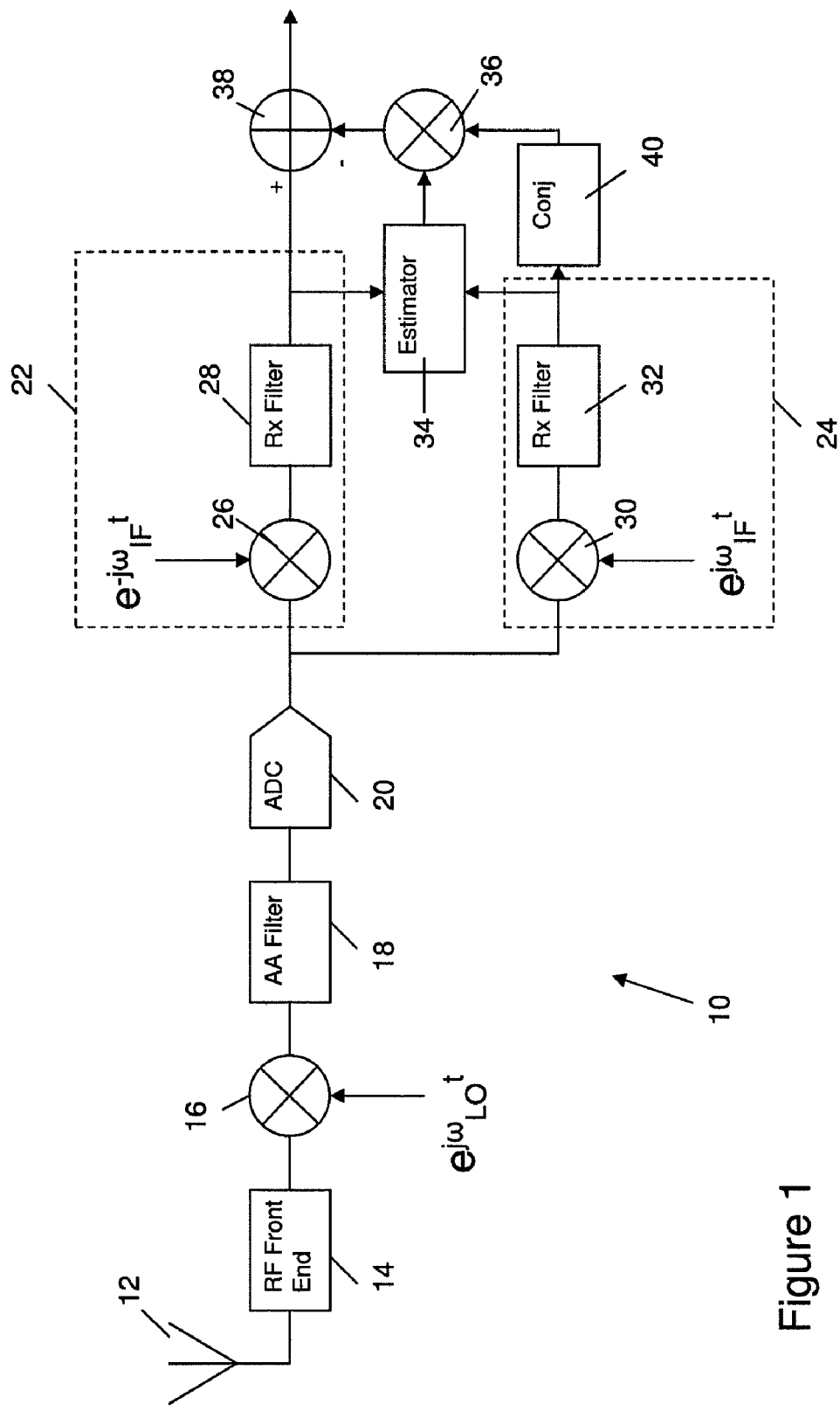

The present invention relates to a method of reducing interference in a received signal, and to a receiver which employs such a method.

It is increasingly common for radio receivers in communications devices such as mobile telephones to use a zero intermediate frequency (IF) for downconversion of a received signal. A disadvantage of this zero IF or direct conversion approach is that imperfections in analogue circuits used in such receivers can give rise to interference at low frequencies. Sources of such interference include mixer non-linearity, which can create low frequency distortion products when a strong interfering signal is present in a received signal. Another common type of interference is zero-frequency (DC) interference in the output of a mixer caused by a local oscillator signal becoming coupled to the mixer input. A further type of interference is low frequency noise generated by semiconductor devices used to process the received signal. To allow the receiver to reject this DC and low frequency interference using linear filtering, the receiver is often arranged such that in analogue processing stages of the receiver the desired signal spectrum does not span DC.

Imbalances in analogue mixer circuits result in a finite image rejection ratio (commonly referred to as IRR). This can cause an interfering signal component present in the mixer input signal at a frequency outside the frequency band containing a signal of interest to appear in the mixer output signal in the frequency band containing the signal of interest, i.e. as an in-band interfering signal. In particular, signals present in the mixer input signal with frequencies having a value around the local oscillator frequency minus the intermediate frequency can appear as in-band interfering signals in the mixer output signal.

Many communications standards include a requirement of 'close-in' selectivity, or adjacent channel interference suppression in order to guarantee a minimum quality of reception in the presence of interfering signals whose frequencies are relatively close to the frequencies occupied by the spectrum of the signal of interest. The finite image rejection ratio of the mixer limits the amount of rejection of interfering signals having frequencies around the local oscillator frequency minus the intermediate frequency. Thus it is desirable to improve the image rejection ratio of such receivers.

According to a first aspect of the invention there is provided a receiver for extracting a desired signal component from a received signal, which received signal contains the desired signal component and may contain an interfering signal component, wherein the receiver comprises a first mixer which generates an intermediate frequency signal containing a frequency-shifted version of the received signal and a frequency-shifted version of an image of the received signal, the receiver further comprising: a second mixer for shifting the desired signal component of the intermediate frequency signal such that it is centred on a baseband frequency, so as to generate a first composite signal containing the shifted desired signal component and a shifted version of any interfering signal component contained in the image of the received signal; a third mixer for shifting an image of the desired signal such that it is centred on the baseband frequency, so as to generate a second composite signal containing the shifted image of the desired signal component and a shifted version of any interfering signal component contained in the received signal; an estimator for estimating, from the first and second composite signals, a coefficient indicative of the amount of the interfering signal component that is present with the desired signal component in a selected one of the composite signals; a multiplier for scaling the complex conjugate of the selected composite signal by the coefficient so estimated; and an adder for subtracting the scaled signal output by the multiplier from the other composite signal to obtain a scaled version of the desired signal component.

The receiver of the present invention overcomes the disadvantages of prior art devices of limited interference rejection ratio (IRR), as it is able to estimate a coefficient indicative of the amount of interference present in the desired signal and compensate for this interference, thus producing an output signal of improved quality whilst avoiding the DC problem.

The estimator may be configured to calculate a power of each of the first and second composite signals, to calculate the correlation of the first and second composite signals and to divide the correlation by the sum of the powers to estimate the coefficient.

The second mixer may shift the desired signal component of the intermediate frequency signal and the image of the interfering signal component of the intermediate frequency signal down in frequency to generate the first composite signal and the third mixer may shift the interfering signal component of the intermediate frequency signal and the image of the desired signal component of the intermediate frequency signal up in frequency to generate the second composite signal.

The baseband frequency may be DC.

The receiver may further comprise a first filter for removing unwanted frequency components from the first composite signal and a second filter for removing unwanted frequency components from the second composite signal.

According to a second aspect of the invention there is provided a method of extracting a desired signal component from a received signal, which received signal contains the desired signal component and may contain an interfering signal component, wherein the method comprises generating an intermediate frequency signal containing a frequency-shifted version of the received signal and a frequency-shifted version of an image of the received signal, the method further comprising: shifting the desired signal component of the intermediate frequency signal such that it is centred on a baseband frequency, so as to generate a first composite signal containing the shifted desired signal component and a shifted version of any interfering signal component contained in the image of the received signal; shifting an image of the desired signal such that it is centred on the baseband frequency, so as to generate a second composite signal containing the shifted image of the desired signal component and a shifted version of any interfering signal component contained in the received signal; estimating, from the first and second composite signals, a coefficient indicative of the amount of the interfering signal component that is present with the desired signal component in a selected one of the composite signals; scaling the complex conjugate of the selected composite signal by the coefficient so estimated; and subtracting the scaled signal output by the multiplier from the other composite signal to obtain a scaled version of the desired signal component.

Estimating the coefficient may comprise calculating a power of each of the first and second composite signals, calculating the correlation of the first and second composite signals and dividing the correlation by the sum of the powers to estimate the coefficient.

The desired signal component of the intermediate frequency signal and the image of the interfering signal component of the intermediate frequency signal may be shifted down in frequency to generate the first composite signal and the interfering signal component of the intermediate frequency signal and the image of the desired signal component of the intermediate frequency signal may be shifted up in frequency to generate the second composite signal.

The baseband frequency may be DC.

The first and second composite signals may be filtered to remove unwanted frequency components.

According to a third aspect of the invention there is provided a computer program for performing the method of the second aspect.

Figure 2A:
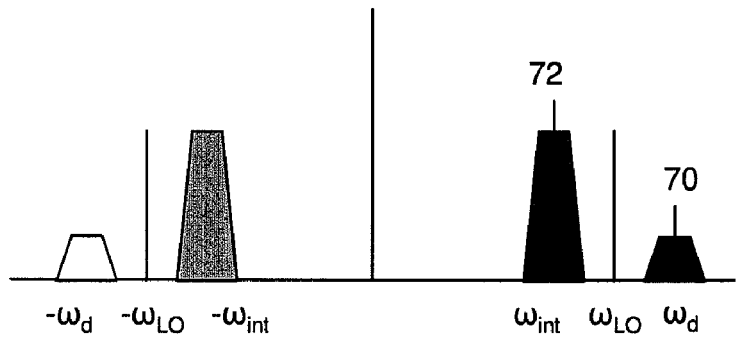
Figure 2B:
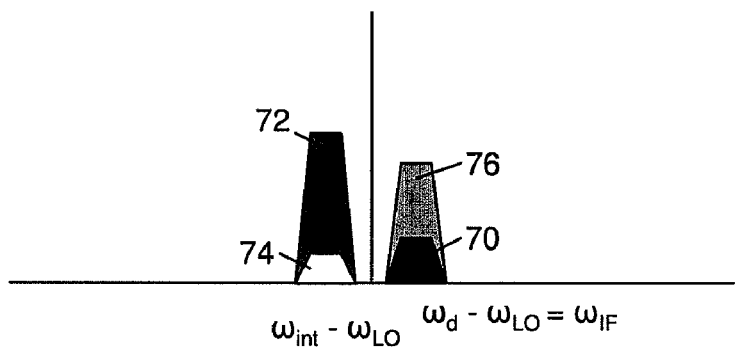
Figure 2C:
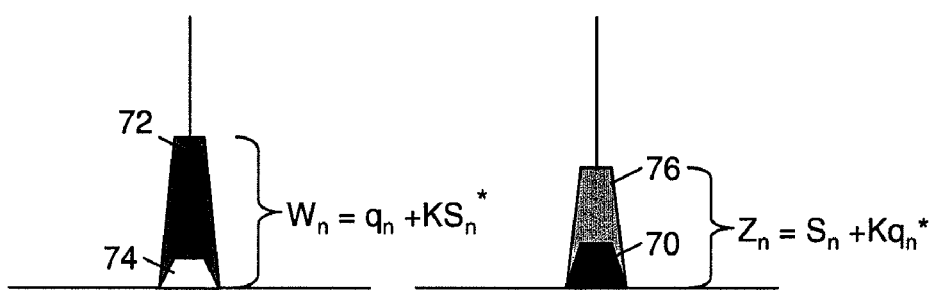

Embodiments of the invention will now be described, strictly by way of example only, with reference to the accompanying drawings, of which FIG. 1 is a schematic representation of part of a receiver which employs the method of the present invention; and FIGS. 2a-2c show exemplary frequency spectra of a received signal at different stages in the receiver shown in FIG. 1.

A receiver according to the present invention is shown generally at 10 in FIG. 1. It will be appreciated that the functional blocks shown in FIG. 1 are not necessarily representative of physical components of a receiver, but are used for the purpose of illustrating the invention. Moreover, for reasons of clarity and brevity only those components of the receiver 10 which are relevant to the invention are illustrated, but it will be apparent to those skilled in the art that the receiver 10 comprises additional components.

The receiver 10 comprises one or more antennae 12 for receiving a signal. The received signal has a frequency spectrum which has a positive frequency part and a negative frequency part, with the magnitude of the negative frequency part being a reflection of the magnitude of the positive frequency part about a zero frequency (DC) position of the frequency spectrum.

The received signal, which typically contains a desired signal component $\omega_d$ and one or more interfering signal components $\omega_{int}$ which may have more energy than the desired signal component, as illustrated in FIG. 2a, passes through an RF front end 14 and subsequently to a mixer 16 where it is mixed with a tone generated by a local oscillator at a frequency $\omega_{LO}$ to frequency shift it, such that the desired signal component is centred on a first intermediate frequency (IF), $\omega_{IF}$, as shown in FIG. 2b. As the mixer 16 is not ideal, its output also contains an image of the desired signal component.

A filter 18 suppresses unwanted frequency components, typically high frequency components present in the output of the mixer 16. The filtered output signal of the mixer 16 is then converted into digital samples by an analogue to digital converter (ADC) block 20, which includes two real ADCs. The output of the ADC block 20 can be represented mathematically as a complex signal.

The sampled signal is then processed by two parallel branches 22, 24. In branch 22, which is equivalent to components of a conventional low IF receiver, the sampled signal is mixed, by a mixer 26, with a tone at a frequency $-\omega_{IF}$, which is equal to the negative of the intermediate frequency $\omega_{IF}$. This has the effect of shifting the desired signal component contained in the sampled IF signal so that its frequency spectrum is centred on a baseband frequency. The branch 22 includes a filter 28 which suppresses undesired high frequency signals present in the output of the mixer 26, such that the output of the filter 28 contains a version of the desired signal whose frequency spectrum is centred on the baseband frequency (which in this example is zero or DC) as is illustrated in the right-hand spectrum of FIG. 2c. Any interfering signal image component present in the IF signal and whose spectrum overlaps that of the desired signal also appears in the output of the filter 28, as is shown in the right-hand spectrum of FIG. 2c.

In branch 24, the sampled signal is mixed, by a mixer 30, with a tone generated by a local oscillator at a frequency which is equal to the intermediate frequency $\omega_{IF}$. This has the effect of shifting the image of the desired signal component contained in the IF signal so that its frequency spectrum is centred on the baseband frequency. The branch 24 includes a filter 32 which suppresses undesired higher frequency signals which are present in the output of the filter 32 such that the output of the filter 32 contains a version of the image of the desired signal whose frequency spectrum is centred on the baseband frequency. Any interfering signal component present in the IF signal whose image has a spectrum which overlaps that of the desired signal component is also present in the output of the filter 32, as is illustrated in the left-hand spectrum of FIG. 2c.

The outputs of the branches 22, 32 are passed to an estimating unit 34, which is operative to calculate a complex coefficient K indicative of the amount of an interfering signal that is present in the output signal of the filter 28. This coefficient K is used by a multiplier 36 to scale the complex conjugate of the interfering signal component contained in the output of the branch 24 (which complex conjugate is calculated in a conjugator 40), and the scaled interfering signal component output by the multiplier 36 is subtracted from the shifted received signal by adder 38. The resulting signal then moves to a demodulation stage (not shown) of the receiver 10.

The operation of the receiver is best illustrated by reference to the exemplary frequency spectra shown in FIGS. 2a-2c.

FIG. 2a shows a spectrum of a received signal having a desired signal component 70 centred on a frequency $\omega_d$ and a strong interfering signal component 72 centred around a frequency $\omega_{int}$, which is a lower frequency than the centre frequency $\omega_d$ of the desired signal component, in this example being equal to $\omega_d$-$2\omega_{IF}$. The interfering signal component 72 may be, for example, an adjacent channel in a mobile telecommunications system.

The spectrum includes negative frequency components corresponding respectively to the desired signal component 70 and the interfering signal component 72.

FIG. 2b shows the spectrum of an intermediate frequency (IF) signal output by the mixer 16. As the mixer 16 is imperfect, the IF signal is corrupted by an image 76 of the interfering signal component 72 generated by the mixer 16. The frequency spectrum of the image 76 of the interfering signal component 72 overlaps the frequency spectrum of the desired signal component 70 of the IF signal.

The interfering image component 76 of the IF signal cannot be separated from the desired signal component 70 using frequency-selective filtering, because the spectra of these two signal components overlap. The overlapping image 76 can impair good quality reception of the desired signal component 70.

The overlapping of the frequency spectrum of the interfering image component 76 with the frequency spectrum of the desired signal component 70 causes difficulties in demodulation of the desired signal component 70, particularly if the interfering signal component 72 (which causes the image 76) has a high power. However, the effect of the interfering signal component 72 on the desired signal component 70 can be reduced, as is described below.

The output signal of the filter 18 is digitised by the ADC block 20, and the digitised signal undergoes parallel processing in the two branches 22, 24.

In branch 22, the signal is mixed, at the mixer 26, with a tone having a frequency of $-\omega_{IF}$ (i.e. a frequency equal to the negative of the intermediate frequency), which has the effect of frequency shifting the shifted desired signal component 70 of the IF signal such that its frequency spectrum is centred on a baseband frequency, which in this example is DC. The overlapping interfering image component 76 is similarly frequency shifted, as is shown in the right-hand spectrum of FIG. 2c. Thus, the shifted desired signal component 70 and the overlapping interfering image component 76 present in the output signal of the filter 28 both have frequency spectra centred on DC and can be said to form a composite signal centred around DC.

In branch 24, the signal is mixed, at the mixer 30, with a tone having a frequency of $\omega_{IF}$ (i.e. a frequency equal to the intermediate frequency), and this has the effect of frequency shifting an image 74 of the desired signal component 70 of the IF signal such that it is centred on DC. The interfering signal component 72 is similarly shifted. Thus, the image 74 of the desired signal component 70 and the interfering signal component 72 present in the output signal of the filter 32 both have frequency spectra centred on DC and can be said form a second composite signal centred around DC, as is shown in the left-hand spectrum of FIG. 2c.

The first and second composite signals output by the mixers 26, 30 are fed into filters 28, 32 to remove any frequency components outside the frequency band of interest, and the signals output by the filters 28, 32 are input to the estimator unit 34.

The estimator unit 34 calculates, from these input signals, a coefficient K whose magnitude is indicative of the amount of the interference that is present with the desired signal component 70 in the output signal of the filter 28. In one embodiment, which is described below, the estimator unit 34 calculates the coefficient K by correlating the signal output by the filter 28 (hereinafter referred to as $Z_n$), which comprises the desired signal component 70 (hereinafter referred to as $S_n$) and the overlapping image 76 of the interfering signal component 72 (hereinafter referred to as $q_n^*$, i.e. the complex conjugate of $q_n$, where $q_n$ is the interfering signal 72), with the signal output by the filter 32 (hereinafter referred to as $W_n$), which comprises the image 74 of the desired signal component 70 (hereinafter referred to as $S_n^*$) and the overlapping interfering signal component 72 (hereinafter referred to as $q_n$). However, other methods of calculating the coefficient K will be apparent to those skilled in the art.

Using the notation introduced above, $$Z_n = S_n + Kq_n^*$$

and $$W_n = q_n + KS_n^*$$

An estimate of the correlation between $Z_n$ and $W_n$ is $$R_{zw} = \frac{1}{N}\sum_{n=0}^{N-1} Z_n W_n$$

$$= \frac{1}{N}\sum_{n=0}^{N-1} (S_n + Kq_n^*)(q_n + KS_n^*)$$

$$= \frac{1}{N}\sum_{n=0}^{N-1} [S_n q_n + Kq_n^* q_n + KS_n S_n^* + K^2 q_n^* S_n^*]$$

It can be assumed that S and q are independent and that signals $S_n$, $q_n$, $Z_n$, $W_n$ have zero mean. Hence the terms $$\frac{1}{N}\sum_{n=0}^{N-1} S_n q_n$$

and $$\frac{1}{N}\sum_{n=0}^{N-1} K^2 q_n^* S_n^*$$

become small for large N, giving $$R_{ZW} = KR_q + KR_s = K(R_q + R_s),$$

where $$R_q = \frac{1}{N}\sum_{n=0}^{N-1} q_n q_n^*$$

is an estimate of the interfering signal power and $$R_s = \frac{1}{N}\sum_{n=0}^{N-1} S_n S_n^*$$

is an estimate of the wanted signal power.

An estimate of the power of $Z_n$ is $$R_{zz^*} = \frac{1}{N}\sum_{n=0}^{N-1} Z_n Z_n^*$$

$$= \frac{1}{N}\sum_{n=0}^{N-1} (S_n + Kq_n^*)(S_n^* + K^* q_n)$$

$$= \frac{1}{N}\sum_{n=0}^{N-1} (S_n S_n^* + Kq_n^* S_n^* + K^* S_n q_n + |K|^2 q_n^* q_n)$$

The terms $$\frac{1}{N}\sum_{n=0}^{N-1} Kq_n^* S_n^*$$

and $$\frac{1}{N}\sum_{n=0}^{N-1} K^* S_n q_n$$

become small for large N, giving $$R_{zz^*} = R_S + |K|^2 R_q$$

Similarly, $$R_{ww^*} = R_q + |K|^2 R_s$$

It follows that $R_{ww^*} + R_{zz^*} = (1 + |K|^2)(R_q + R_s)$ It can be assumed that the magnitude of K is small (typically around 0.01) so $|K|^2$ is very small. This assumption is valid because the imbalances in the mixer 16 are typically small. Thus K can be approximated:

$$K \approx \frac{R_{zw}}{R_q + R_s} \approx \frac{R_{zw}}{R_{ww^*} + R_{zz^*}}$$

The signal output by the filter 32 is complex conjugated in the conjugator 40 and then scaled at the multiplier 36 by the coefficient K, and this scaled signal is subtracted from the signal output by the filter 28, to give an output signal $$Z_n - KW_n^* = S_n + Kq_n^* - K(q_n + K^*S_n^*)^*$$
$$= S_n + Kq_n^* - Kq_n^* - |K|^2 S_n$$
$$= S_n(1 - |K|^2)$$

Thus, the signal output by the adder 38 for demodulation comprises only a slightly scaled version of the desired signal component 70, and the interfering signal component 72 (and its image 76) is not present in the signal output by the adder 38.

The embodiment above has been described in terms of functional blocks of a receiver, and it will be apparent that these functional blocks can be implemented in a variety of ways, for example as hardware elements or as software running on a suitably configured microprocessor.

The invention claimed is:

1. A receiver for extracting a desired signal component from a received signal, which received signal contains the desired signal component and may contain an interfering signal component, wherein the receiver comprises a first mixer which generates an intermediate frequency signal containing a frequency-shifted version of the received signal and a frequency-shifted version of an image of the received signal, the receiver further comprising:
    a second mixer for shifting the desired signal component of the intermediate frequency signal such that it is centered on a baseband frequency, so as to generate a first composite signal containing the shifted desired signal component and a shifted version of any interfering signal component contained in the image of the received signal;
    a third mixer for shifting an image of the desired signal such that it is centered on the baseband frequency, so as to generate a second composite signal containing the shifted image of the desired signal component and a shifted version of any interfering signal component contained in the received signal;
    an estimator for estimating, from the first and second composite signals, a coefficient whose magnitude is indicative of the amount of the interfering signal component that is present with the desired signal component in a selected one of the composite signals;
    a multiplier for scaling the complex conjugate of the selected composite signal by the coefficient so estimated; and
    an adder for subtracting the scaled signal output by the multiplier from the other composite signal to obtain a scaled version of the desired signal component.

2. A receiver according to claim 1 wherein the estimator is configured to calculate a power of each of the first and second composite signals, to calculate the correlation of the first and second composite signals and to divide the correlation by the sum of the powers to estimate the coefficient.

3. A receiver according to claim 1 wherein the second mixer shifts the desired signal component of the intermediate frequency signal and the image of the interfering signal component of the intermediate frequency signal down in frequency to generate the first composite signal and the third mixer shifts the interfering signal component of the intermediate frequency signal and the image of the desired signal component of the intermediate frequency signal up in frequency to generate the second composite signal.

4. A receiver according to claim 3 wherein the baseband frequency is DC.

5. A receiver according to claim 1 further comprising a first filter for removing unwanted frequency components from the first composite signal and a second filter for removing unwanted frequency components from the second composite signal.

6. A method of extracting a desired signal component from a received signal, which received signal contains the desired signal component and may contain an interfering signal component, wherein the method comprises generating an intermediate frequency signal containing a frequency-shifted version of the received signal and a frequency-shifted version of an image of the received signal, the method further comprising:
    shifting the desired signal component of the intermediate frequency signal such that it is centered on a baseband frequency, so as to generate a first composite signal containing the shifted desired signal component and a shifted version of any interfering signal component contained in the image of the received signal;
    shifting an image of the desired signal such that it is centered on the baseband frequency, so as to generate a second composite signal containing the shifted image of the desired signal component and a shifted version of any interfering signal component contained in the received signal;
    estimating, from the first and second composite signals, a coefficient indicative of the amount of the interfering signal component that is present with the desired signal component in a selected one of the composite signals;
    scaling the complex conjugate of the selected composite signal by the coefficient so estimated; and
    subtracting the scaled signal output by the multiplier from the other composite signal to obtain a scaled version of the desired signal component.

7. A method according to claim 6 wherein estimating the coefficient comprises calculating a power of each of the first and second composite signals, calculating the correlation of the first and second composite signals and dividing the correlation by the sum of the powers to estimate the coefficient.

8. A method according to claim 6 wherein the desired signal component of the intermediate frequency signal and the image of the interfering signal component of the intermediate signal are shifted down in frequency to generate the first composite signal and the interfering signal component of the intermediate frequency signal and the image of the desired signal component of the intermediate frequency signal are shifted up in frequency to generate the second composite signal.

9. A method according to claim 8 wherein the baseband frequency is DC.

10. A method according to claim 6 wherein the first and second composite signals are filtered to remove unwanted frequency components.

11. A computer program for performing the method of claim 6.

* * * * *